(12) United States Patent
Zhao

(10) Patent No.: US 11,310,811 B2
(45) Date of Patent: Apr. 19, 2022

(54) MEDIA ACCESS CONTROL LAYER ARCHITECTURE, METHOD FOR TRANSMITTING DATA, NETWORK-SIDE DEVICE AND TERMINAL

(71) Applicant: CHINA ACADEMY OF TELECOMMUNICATIONS TECHNOLOGY, Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 444 days.

(21) Appl. No.: 16/336,608

(22) PCT Filed: Sep. 26, 2017

(86) PCT No.: PCT/CN2017/103307
§ 371 (c)(1),
(2) Date: Mar. 26, 2019

(87) PCT Pub. No.: WO2018/059368
PCT Pub. Date: Apr. 5, 2018

(65) Prior Publication Data
US 2021/0289520 A1   Sep. 16, 2021

(30) Foreign Application Priority Data

Sep. 27, 2016 (CN) .......................... 201610855595.8

(51) Int. Cl.
*H04W 72/04* (2009.01)
*H04W 72/12* (2009.01)
(Continued)

(52) U.S. Cl.
CPC .......... *H04W 72/1263* (2013.01); *H04L 1/08* (2013.01); *H04W 28/0263* (2013.01); *H04W 28/0278* (2013.01)

(58) Field of Classification Search
CPC ..... H04L 1/1812; H04L 47/50; H04L 12/863; H04W 52/365; H04W 72/12;
(Continued)

(56) References Cited

U.S. PATENT DOCUMENTS

2007/0047451 A1* 3/2007 Lohr ..................... H04L 1/1822
  370/242
2007/0047452 A1* 3/2007 Lohr ..................... H04L 1/1829
  370/242
(Continued)

FOREIGN PATENT DOCUMENTS

CN      102548005 A     7/2012
CN      102625377 A     8/2012
(Continued)

OTHER PUBLICATIONS

International Search Report for PCT/CN2017/103307 dated Jan. 9, 2018 and its English translation provided by WIPO.
(Continued)

*Primary Examiner* — Nathan S Taylor
(74) *Attorney, Agent, or Firm* — Ladas & Parry, LLP

(57) ABSTRACT

A media access control layer architecture, a method for transmitting data, a network-side device and a terminal are provided. The media access control layer architecture of the network-side device includes: a common scheduling function unit; at least one dedicated scheduling function unit, each dedicated scheduling function unit corresponding to a bearer set including one or more bearers; and more than one
(Continued)

multiplexing and retransmission function unit, each multiplexing and retransmission function unit corresponding to one terminal.

16 Claims, 8 Drawing Sheets

(51) Int. Cl.
*H04L 1/08* (2006.01)
*H04W 28/02* (2009.01)
(58) Field of Classification Search
CPC ......... H04W 28/0252; H04W 28/0263; H04W 28/0278; H04W 72/0413; H04W 72/1221; H04W 72/1263; H04W 76/15; H04W 88/00; H04W 88/085; H04W 72/04; H04W 76/00
USPC ...................................................... 370/32, 2
See application file for complete search history.

(56) References Cited

U.S. PATENT DOCUMENTS

| | | | |
|---|---|---|---|
| 2007/0297360 A1* | 12/2007 | Joachim | H04W 52/50 370/329 |
| 2008/0254804 A1* | 10/2008 | Lohr | H04W 72/14 455/442 |
| 2012/0033554 A1* | 2/2012 | Shiva | H04W 72/02 370/235 |
| 2013/0016649 A1* | 1/2013 | Damnjanovic | H04W 88/04 370/315 |
| 2013/0021932 A1* | 1/2013 | Damnjanovic | H04W 52/0229 370/252 |
| 2014/0029536 A1* | 1/2014 | Tian | H04W 72/087 370/329 |
| 2015/0087298 A1* | 3/2015 | Li | H04W 76/45 455/426.1 |
| 2015/0188680 A1* | 7/2015 | Li | H04W 28/0278 370/329 |
| 2015/0188681 A1* | 7/2015 | Li | H04L 5/0032 370/252 |
| 2015/0189574 A1* | 7/2015 | Ng | H04W 24/08 370/252 |
| 2015/0215944 A1* | 7/2015 | Kim | H04L 5/001 370/329 |
| 2016/0112823 A1* | 4/2016 | Vrind | H04L 69/04 370/329 |
| 2016/0119945 A1* | 4/2016 | Fang | H04W 28/0278 455/450 |
| 2017/0064534 A1* | 3/2017 | Loehr | H04W 72/1268 |
| 2017/0202005 A1* | 7/2017 | Madan | H04W 72/1231 |
| 2017/0311290 A1* | 10/2017 | Adjakple | H04W 76/18 |

FOREIGN PATENT DOCUMENTS

| | | | |
|---|---|---|---|
| EP | 2178224 A1 | 4/2010 | |
| EP | 2942993 A1 | 11/2015 | |

OTHER PUBLICATIONS

Written Opinion of the International Searching Authority for PCT/CN2017/103307 dated Jan. 9, 2018 and its English translation provided by Google Translate.
Extended European Search Report from EP 17854818.6, dated Jul. 19, 2019.
Written Opinion of the International Searching Authority from PCT/CN2017/103307, dated Jan. 9, 2019, with English translation from WIPO.
International Preliminary Report on Patentability from PCT/CN2017/103307, dated Apr. 2, 2019, with English translation from WIPO.

* cited by examiner

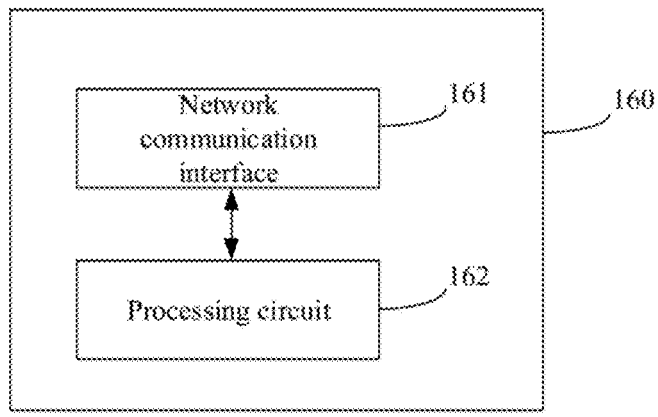

Fig. 16

| |
|---|
| The common scheduling function unit determines a correspondence between a radio bearer and a bearer set, and transmits the radio bearer to a corresponding dedicated scheduling function unit and/or receives the corresponding radio bearer from the dedicated scheduling function unit according to the correspondence — 171 |

↓

| |
|---|
| The dedicated scheduling function unit allocates physical resources corresponding to the dedicated scheduling function unit among the bearers of the terminal belonging to the bearer set based on a priority of the terminal and/or priorities of the bearers corresponding to the bearer set served by the dedicated scheduling function unit — 172 |

↓

| |
|---|
| The multiplexing and retransmission function unit performs multiplexing and hybrid automatic repeat on uplink data of the bearer set corresponding to the multiplexing and retransmission function unit according to a resource allocation result of the dedicated scheduling function unit — 173 |

Fig. 17

MEDIA ACCESS CONTROL LAYER ARCHITECTURE, METHOD FOR TRANSMITTING DATA, NETWORK-SIDE DEVICE AND TERMINAL

CROSS-REFERENCE TO RELATED APPLICATION

This application is the U.S. national phase of PCT Application No. PCT/CN2017/103307 filed on Sep. 26, 2017, which claims a priority to Chinese Patent Application No. 201610855595.8 filed on Sep. 27, 2016, the disclosures of which are incorporated in their entireties by reference herein.

TECHNICAL FIELD

The present disclosure relates to the field of mobile communication technologies, and more particularly, to a media access control layer architecture, a method for transmitting data, a network-side device and a terminal.

BACKGROUND

Frame structures are respectively defined for Frequency Division Duplex (FDD) and Time Division Duplex (TDD) in the conventional Long Term Evolution (LTE) system.

An LTE FDD system uses a frame structure type 1 (FS1), as shown in FIG. 1. Uplink and downlink transmissions use different carrier frequencies, and adopt the same frame structure. A radio frame of 10 ms includes 10 subframes of 1 ms, each subframe is divided into two time slots of 0.5 ms. A Transmission Time Interval (TTI) for uplink and downlink data transmission is 1 ms.

An LTE FDD system uses a frame structure type 2 (FS2), as shown in FIG. 2. Uplink and downlink transmissions use different subframes or different time slots on the same frequency. Each radio frame of 10 ms consists of two half frames of 5 ms, and each half frame includes five subframes of 1 ms. The subframes in FS2 include three types: downlink subframe, uplink subframe and special subframe. Each special subframe consists of three parts that include a Downlink Pilot Time Slot (DwPTS), a Guard Period (GP) and an Uplink Pilot Time Slot (UpPTS). Each half frame includes at least one downlink subframe, at least one uplink subframe, and at most one special subframe. According to different downlink-to-uplink switch-point periodicities and downlink-uplink allocation proportions, seven TDD downlink-uplink configurations as shown in Table 1 are defined.

TABLE 1

| Downlink-Uplink Configuration | Downlink-to-UpLink Switch-point Periodicity | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

A baseband parameter (numerology) is a terminology of RAN1, which includes various aspects of contents, such as subcarrier interval, CP length, TTI length. For example, the numerology in the LTE system is defined as follows.

Two Cyclic Prefix (CP) types are defined for FDD and TDD (the following definitions are made for ordinary subframes and the quantity of symbols included in the special subframe is shorter than that in the following definitions): normal CP and extended CP. For uplink transmission, a subcarrier interval $\Delta f=15$ kHz is defined. In a case of the normal CP, each time slot includes seven Single Carrier Frequency Division Multiple Access (SC-FDMA) symbols, where a CP length of the first SC-FDMA symbol is 160 Ts and a CP length of other SC-FDMA symbols is 144 Ts. In a case of the extended CP, each time slot includes six SC-FDMA symbols, and a CP length of each SC-FDMA symbol is 512 Ts. For downlink transmission, in a case of the normal CP, a subcarrier interval $\Delta f=15$ kHz is defined, and each time slot includes seven OFDM symbols, where a CP length of the first OFDM symbol is 160 Ts and a CP length of other OFDM symbols is 144 Ts. In a case of the extended CP, two subcarrier intervals $\Delta f=15$ kHz and $\Delta f=7.5$ kHz are defined, when the subcarrier interval is $\Delta f=15$ kHz, each time slot includes six OFDM symbols, a CP length of each OFDM symbol is 512 Ts, and when the subcarrier interval is $\Delta f=7.5$ kHz, each time slot includes three OFDM symbols, and a CP length of each OFDM symbol is 1024 Ts. Ts is a system sampling interval, and is defined as $307200*Ts=10$ ms. $\Delta f=7.5$ kHz is only used for multicast services and is only used in the configured Multimedia Broadcast multicast service Single Frequency Network (MBSFN) subframes.

In a new generation radio network system (5G System), a new network architecture will be introduced, which is schematically shown in FIG. 3. A network-side node includes a Central Unit (CU) and a distributed unit (TRP, Transmission Reception Point), while a user-side node is a terminal (UE). At the network side, a CU controls multiple distributed units (TRPs) deployed in a certain area and performs air interface transmission with the terminal through the TRP. That is, the network-side node includes two layers of network structures (CU and TRP). One or more TRPs can simultaneously serve one terminal for data transmission. There may be transmissions in multiple beam directions for one TRP, such as Beam1, Beam2 and Beam3 for TRP4 in FIG. 3.

Multiple designs of different baseband parameters (numerology) are introduced in the 3rd Generation Partnership Project (3GPPP) Radio Access Network 1 (RAN1). For a future mobile communication system, multiple designs of different baseband parameters (numerology) are introduced in a physical layer for the 3GPP RAN1, and it has been clear that time division/frequency division multiplexing on resources can be conducted among different numerologies.

Since the multiple designs of different numerologies are introduced in the 3GPP RAN1, RAN2 needs to consider how to use these numerologies in a Media Access Control (MAC) layer, so as to provide better services for data transmission.

SUMMARY

The technical problem to be solved by embodiments of the present disclosure is to provide a media access control layer architecture, a method for transmitting data, a network-side device and a terminal, which design a corresponding media access control layer architecture for various bearer sets, and realize data processing for services based on different bearer sets.

In order to solve the foregoing technical problem, the embodiments of the present disclosure provide a network-side media access control layer architecture, including:

a common scheduling function unit;

at least one dedicated scheduling function unit, each dedicated scheduling function unit corresponding to a bearer set including one or more bearers; and more than one multiplexing and retransmission function unit, each multiplexing and retransmission function unit corresponding to one terminal.

The embodiments of the present disclosure further provide a network-side device, which includes the media access control layer architecture as described above.

The embodiments of the present disclosure further provide a method for transmitting data, applied to the network-side media access control layer architecture as described above, and the method for transmitting data includes:

determining, by the common scheduling function unit, resources allocated to each bearer set, determining a correspondence between a radio bearer and the bearer set, and transmitting the radio bearer to the corresponding dedicated scheduling function unit and/or receiving the corresponding radio bearer from the dedicated scheduling function unit according to the correspondence;

performing, by the dedicated scheduling function unit, based on priorities of terminals corresponding to the bearer set served by the dedicated scheduling function unit and/or priorities of the bearers of the bearer set served by the dedicated scheduling function unit, resource allocation on physical resources corresponding to the dedicated scheduling function unit among the terminals and the bearers of the terminals belonging to the bearer set; and performing, by the multiplexing and retransmission function unit, multiplexing and hybrid automatic repeat on downlink data of the terminal corresponding to the multiplexing and retransmission function unit according to a resource allocation result of the dedicated scheduling function unit.

The embodiments of the present disclosure also provide a terminal-side media access control layer architecture, including:

a common scheduling function unit;

at least one dedicated scheduling function unit, each dedicated scheduling function unit corresponding to a bearer set of a terminal, and the bearer set including one or more bearers; and more than one multiplexing and retransmission function unit, each multiplexing and retransmission function unit corresponding to one bearer set of the terminal.

The embodiments of the present disclosure further provide a terminal, which includes the media access control layer architecture as described above.

The embodiments of the present disclosure further provide a method for transmitting data, applied to the media access control layer architecture as described above, and the method for transmitting data includes:

determining, by the common scheduling function unit, a correspondence between a radio bearer and the bearer set, and transmitting the radio bearer to the corresponding dedicated scheduling function unit and/or receiving the corresponding radio bearer from the dedicated scheduling function unit according to the correspondence;

performing, by the dedicated scheduling function unit, based on a priority of the terminal and/or priorities of bearers corresponding to the bearer set served by the dedicated scheduling function unit, resource allocation on physical resources corresponding to the dedicated scheduling function unit among the bearers of the terminal belonging to the bearer set; and performing, by the multiplexing and retransmission function unit, multiplexing and hybrid automatic repeat on uplink data of the bearer set corresponding to the multiplexing and retransmission function unit according to a resource allocation result of the dedicated scheduling function unit.

The embodiments of the present disclosure further provide a network-side device including a transceiver, a processor and a memory, wherein the processor, by executing data or programs stored in the memory, is configured to: determine resources allocated to each bearer set, determine a correspondence between a radio bearer and the bearer set, and control the transceiver to transmit the radio bearer and/or receive the radio bearer according to the correspondence;

perform, based on priorities of terminals corresponding to the bearer set and/or priorities of bearers of the bearer set, resource allocation on corresponding physical resources among the terminals and the bearers of the terminals belonging to the bearer set; and perform multiplexing and hybrid automatic repeat on downlink data of the corresponding terminals according to a resource allocation result.

The embodiments of the present disclosure further provide a terminal, including a transceiver, a processor and a memory, wherein:

the processor, by executing data or programs stored in the memory, is configured to: determine a correspondence between a radio bearer and a bearer set, and control the transceiver to transmit the radio bearer and/or receive the radio bearer according to the correspondence;

perform, based on priorities of bearers corresponding to the bearer set served, resource allocation on corresponding physical resources among the bearers belonging to the bearer set; and perform multiplexing and hybrid automatic repeat on uplink data of the corresponding bearer set according to a resource allocation result.

According to the media access control layer architecture, the method for transmitting data, the network-side device and the terminal provided by the embodiments of the present disclosure, an MAC layer architecture is provided, which can provide a service for a network using multiple bearer sets, and perform data processing on services based on different bearer sets, so that the multiple bearer sets can well cooperate in working.

BRIEF DESCRIPTION OF THE DRAWINGS

FIG. 16 is a block diagram of an example of a network-side device according to an embodiment of the present disclosure; and FIG. 17 is a block diagram of another example of a network-side device according to an embodiment of the present disclosure.

DETAILED DESCRIPTION

Figure 1:
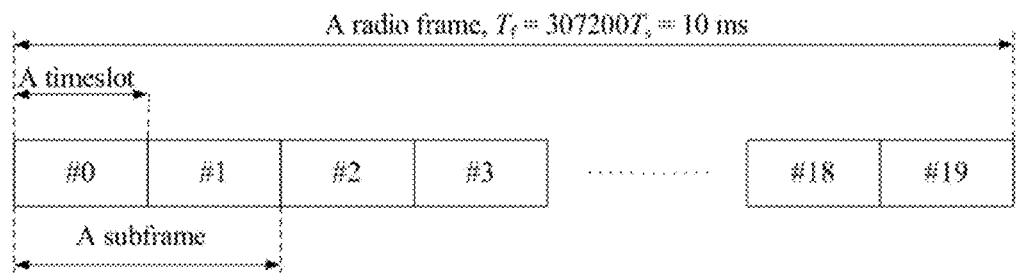
FIG. 1 is a schematic diagram of a frame structure used in a LTE FDD system of the related technologies.
Figure 2:
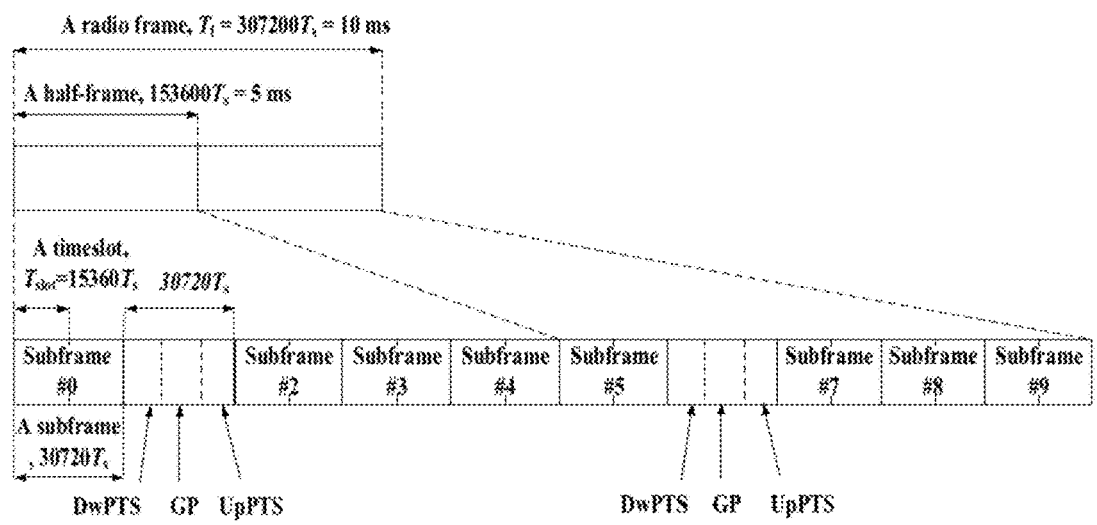
FIG. 2 is a schematic diagram of a frame structure used in a LTE TDD system of the related technologies.
Figure 3:
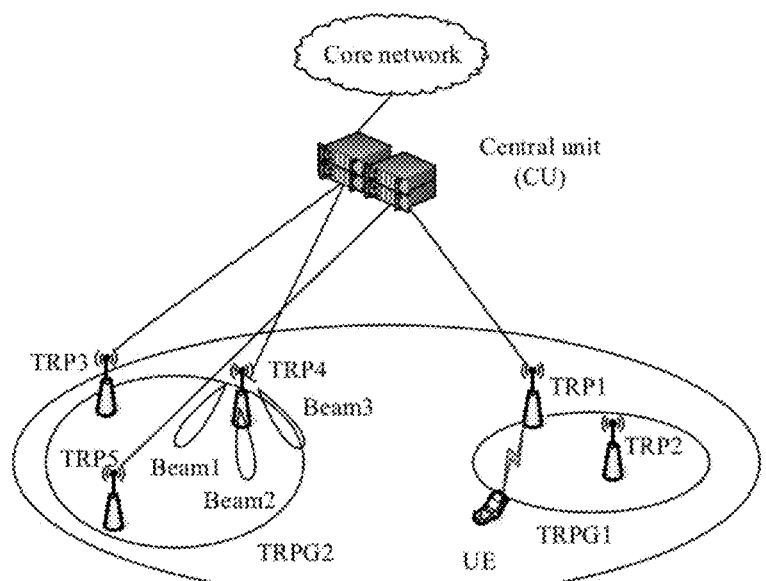
FIG. 3 is a schematic diagram of a architecture of a new generation radio network system proposed by the related technologies.

To make the technical problems to be solved, technical solutions, and advantages of the present disclosure clearer, following detailed description is made with reference to the drawings and specific embodiments. In the following description, specific details such as detailed configurations and components, are provided merely to assist in a comprehensive understanding of the embodiments of the present disclosure. Therefore, it should be clear to those skilled in the art that various changes and modifications can be made to the embodiments described herein without departing from the scope and spirit of the present disclosure. In addition, descriptions of known functions and configurations are omitted for clarity and conciseness.

It should be appreciated that any reference in this specification to "one embodiment" or "an embodiment" means that particular features, structures, or characteristics described in connection with the embodiment are included in at least one embodiment of the present disclosure. Therefore, "in one embodiment" or "in an embodiment" appearing throughout this specification may not necessarily refer to the same embodiment. Furthermore, these particular features, structures, or characteristics may be combined in one or more embodiments in any suitable manner.

It should be understood that in various embodiments of the present disclosure, the magnitude of the sequence numbers of the following processes does not represent the order of execution, and the order of execution of each process should be determined by its function and internal logic, and should not constitute any limitation on the implementation process of the embodiments of the present disclosure.

Moreover, the terminologies "system" and "network" are often used interchangeably herein.

It should be understood that the term "and/or" herein is merely to describe an association relationship of contextual objects, indicating that there may be three relationships, for example, A and/or B may represent three situations: only A, both A and B, and only B. In addition, the character "/" herein generally indicates that the contextual objects are of an "or" relationship.

In the embodiments provided in this application, it should be understood that "B corresponding to A" means B is associated with A, and B may be determined according to A. However, it should also be understood that determining B according to A does not mean that B is determined only according to A, but also may be determined according to A and/or other information.

In the embodiments of the present disclosure, a bearer set includes one or more bearers. The bearers contained in the same bearer set have same or similar QoS (Quality of Service) parameters, or, the bearers contained in the same bearer set use the same baseband parameter (numerology), or, the bearers contained in the same bearer set belong to the same network slice. The similar QoS parameters mean that the difference of the QoS parameters of different bearers in the same bearer set is within a predetermined range.

According to the embodiments of the present disclosure, a corresponding media access control layer is designed with respect to a plurality of bearer sets (for example, a plurality of baseband parameters numerology) possibly introduced in a physical layer. With the media access control layer of the embodiments of the present disclosure, data processing may be performed on services that are based on different bearer sets, and services may be provided for data transmission.

First Embodiment

Figure 4:
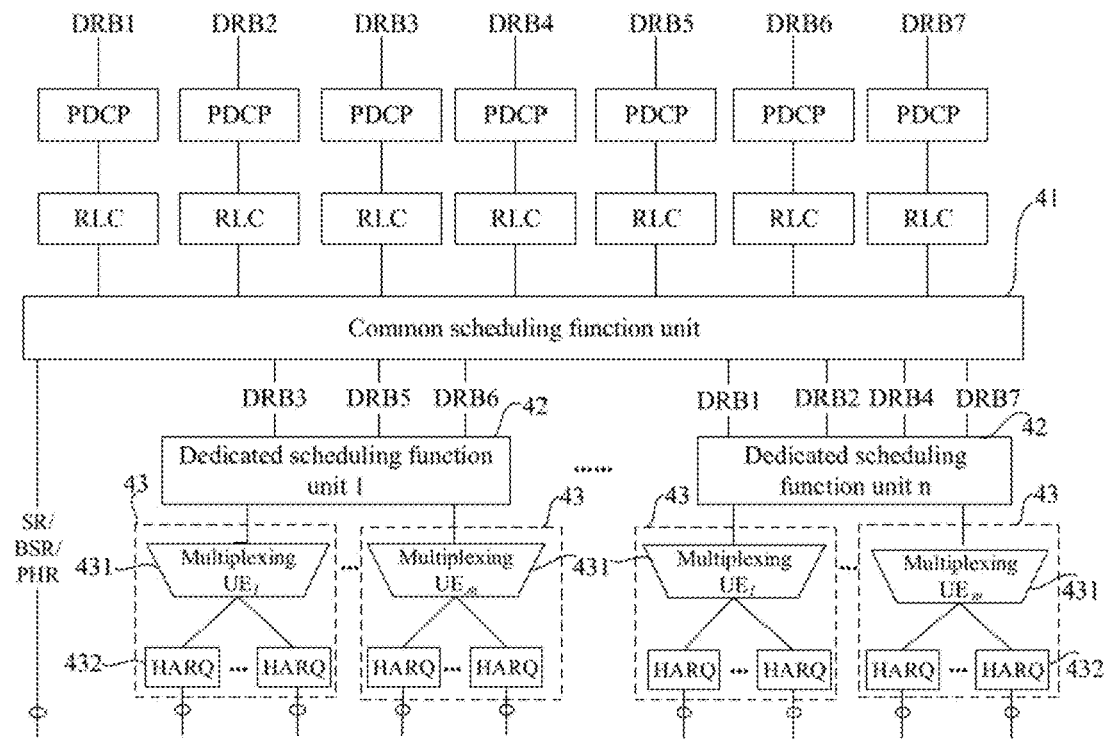
FIG. 4 is a schematic diagram of a media access control layer architecture according to an embodiment of the present disclosure.

Reference is made to FIG. 4. A media access control layer architecture of a network-side device provided by the embodiments of the present disclosure includes:

a common scheduling function unit 41;

at least one dedicated scheduling function unit 42, each dedicated scheduling function unit corresponding to a bearer set, and the bearer set including one or more bearers; and more than one multiplexing and retransmission function unit 43, each multiplexing and retransmission function unit 43 corresponding to a terminal.

In FIG. 4, each multiplexing and retransmission function unit 43 includes one multiplexing function unit 431, such as Multiplexing UE.1 to Multiplexing UE.m in FIG. 4, and each multiplexing function unit 431 is respectively corresponding to one terminal. The multiplexing function unit 431 of each multiplexing and retransmission function unit 43 is also connected with a plurality of retransmission function units 432. As shown in Hybrid Automatic Repeat Request (HARQ) in FIG. 4, each retransmission function unit 432 is generally corresponding to one HARQ process. In order to realize the data processing function for services that are based on different bearer sets, the functions of the network-side media access control layer are divided into the above three function units in the embodiments of the present disclosure divides.

In FIG. 4, the common scheduling function unit 41 may be configured to execute one or more of the following functions:

1) determining resources allocated to each bearer set, the resources herein include time domain/frequency domain/spatial domain resources;

2) determining a mapping relationship between a Radio Bearer (RB) and the bearer set;

3) receiving a Buffer Status Report (BSR) of the terminal;

4) receiving Scheduling Request (SR) information of the terminal;

5) reporting allocated resources for BSR of the terminal;

6) determining uplink buffer status information of each bearer set according to BSR, and transmitting the uplink buffer status information to the dedicated scheduling function unit corresponding to the each bearer set;

7) receiving and processing Power Headroom Report (PHR) information of a physical layer; or 8) allocating a terminal transmission power among the bearer sets to obtain terminal power allocation information of the bearer sets and transmit the terminal power allocation information to the dedicated scheduling function unit corresponding to each bearer set.

To be specific, the common scheduling function unit 41 may determine the mapping relationship between the RB and the bearer set according to one or more of the following parameters: a QoS parameter of the RB, a mapping relationship between the RB and a network slice, or, a mapping relationship between the RB and a numerology.

To be specific, the common scheduling function unit 41 may determine resources allocated to the bearer set corresponding to each dedicated scheduling function unit according to one or more of: static allocation, semi-static allocation or dynamic allocation. Here, the static allocation means that the resources allocated to the bearer set are predetermined and remain unchanged in the service process. The dynamic allocation means that the resources allocated to the bearer set may be dynamically adjusted during the service process. The semi-static allocation means that the resources allocated to the bearer set are predetermined and may be adjusted according to a preset period in the service process. In the dynamic allocation or semi-static allocation, the common scheduling function unit 41 may adjust physical resources allocated for each dedicated scheduling function unit according to feedback information of each dedicated scheduling function unit 42. Here, the feedback information may include, but is not limited to, resource occupancy information.

Among the above functions, the common scheduling function unit 41 may perform processing related to other functions based on an execution result of one of the functions. For example, the common scheduling function unit 41 may allocate a terminal transmission power among the various bearer sets according to a power headroom report of a physical layer. Further for example, the common scheduling function unit 41 may report allocated resources for BSR of the terminal according to the Scheduling Request (SR) information of the terminal received.

The common scheduling function unit 41 according to the embodiments of the present disclosure may execute one or more of the above functions.

For example, the common scheduling function unit 41 may be configured to determine resources allocated to each bearer set, determine a mapping relationship between a radio bearer and the bearer set, and transmit the radio bearer to a corresponding dedicated scheduling function unit 42 and/or receive the corresponding radio bearer from the dedicated scheduling function unit 42 according to the mapping relationship.

Further for example, the common scheduling function unit 41 may be configured to receive a scheduling request of the terminal, report allocated resources for the Buffer Status Report BSR of the terminal, receive the buffer status report from the terminal, determine uplink buffer status information of each bearer set according to the buffer status report from the terminal, and transmit the uplink buffer status information to the dedicated scheduling function unit 42 corresponding to each bearer set.

Further for example, the common scheduling function unit 41 may be configured to receive and process the power headroom report information of the physical layer, allocate a terminal transmission power among the bearer sets, to obtain terminal power allocation information of the bearer sets and transmit the terminal power allocation information to the dedicated scheduling function unit 42 corresponding to each bearer set.

Further for example, the common scheduling function unit 41 may be configured to receive the scheduling request of the terminal and report allocated resources for the Buffer Status Report BSR of the terminal, determine buffer status information of each bearer set according to the buffer status report from the terminal and transmit the buffer status information to the dedicated scheduling function unit 42 corresponding to each bearer set, receive and process the power headroom report information of the physical layer, and, allocate the terminal transmission power among the bearer sets to obtain the terminal power allocation information of the bearer sets and transmit the terminal power allocation information to the dedicated scheduling function unit 42 corresponding to each bearer set.

In FIG. 4, the dedicated scheduling function unit 42 may be configured to allocate, based on priorities of terminals and/or of the bearers corresponding to the bearer set served by the dedicated scheduling function unit, physical resources corresponding to the dedicated scheduling function unit among the terminals and the bearers of the terminals belonging to the bearer set.

To be specific, the dedicated scheduling function unit 42 may further allocate resources in the bearer set served by the dedicated scheduling function unit according to one or more of the following manners:

1) allocating downlink resources based on downlink buffer status information corresponding to a downlink bearer set served by the dedicated scheduling function unit;

2) allocating uplink resources based on uplink buffer status information corresponding to an uplink bearer set served by the dedicated scheduling function unit that is provided by the common scheduling function unit; or 3) allocating the uplink resources for the terminal served by the dedicated scheduling function unit according to the terminal power allocation information provided by the common scheduling function unit.

In FIG. 4, the multiplexing and retransmission function unit 43 may be configured to perform multiplexing and hybrid automatic repeat (HARQ) on downlink data of the terminal corresponding to the multiplexing and retransmission function unit 43.

The specific functions of each function unit are described above in connection with the function units of the network-side media access control layer provided in FIG. 4. With the above function units, the embodiments of the present disclosure design a corresponding media access control layer architecture for various bearer sets, and realize data processing for services that are based on different bearer sets.

In the embodiments of the present disclosure, the above-mentioned function units of the network-side media access control layer as shown in FIG. 4 may be located in different MAC entities. Descriptions are further provided hereinafter with reference to the accompanying drawings.

Figure 5:
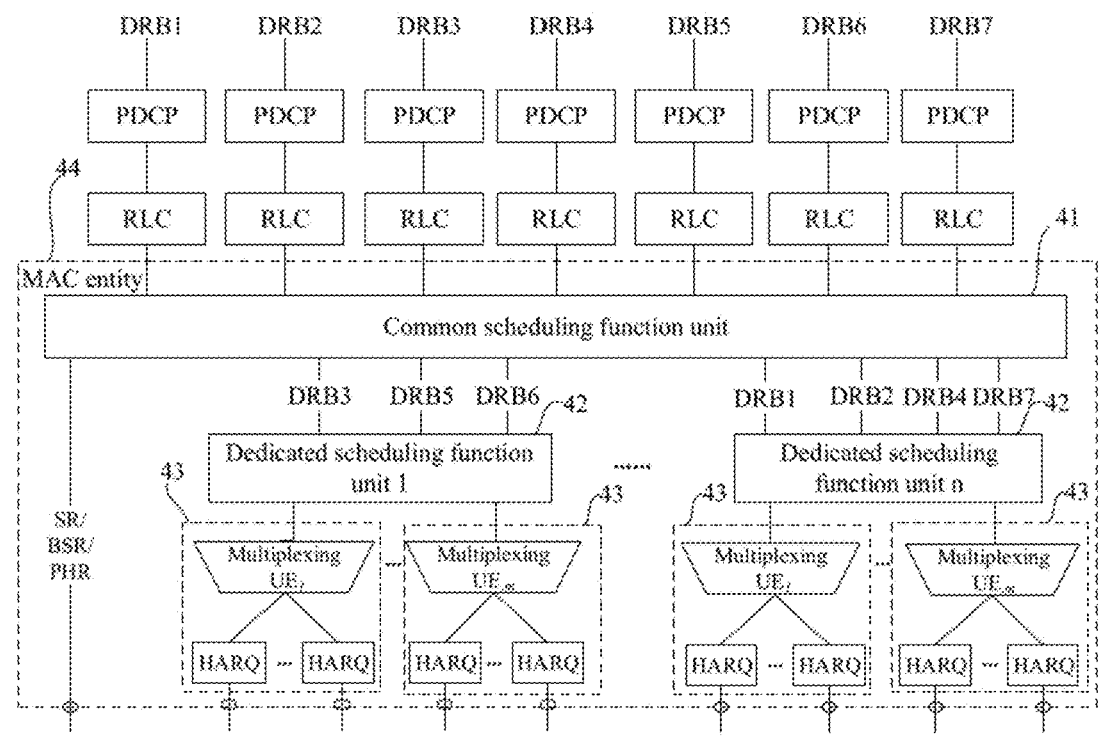
FIG. 5 is a schematic flow chart of a method for transmitting data according to an embodiment of the present disclosure.

Reference is made to FIG. 5. In FIG. 5, the common scheduling function unit 41, all the dedicated scheduling function units 42 and all the multiplexing and retransmission function units 43 are all located in the same MAC entity 44.

For the terminal side, an MAC entity thereof corresponds to that of the network side. For the media access control layer architecture shown in FIG. 5, there is one MAC entity at the network side, then the terminal side also has only one MAC entity for the network device.

Figure 6:
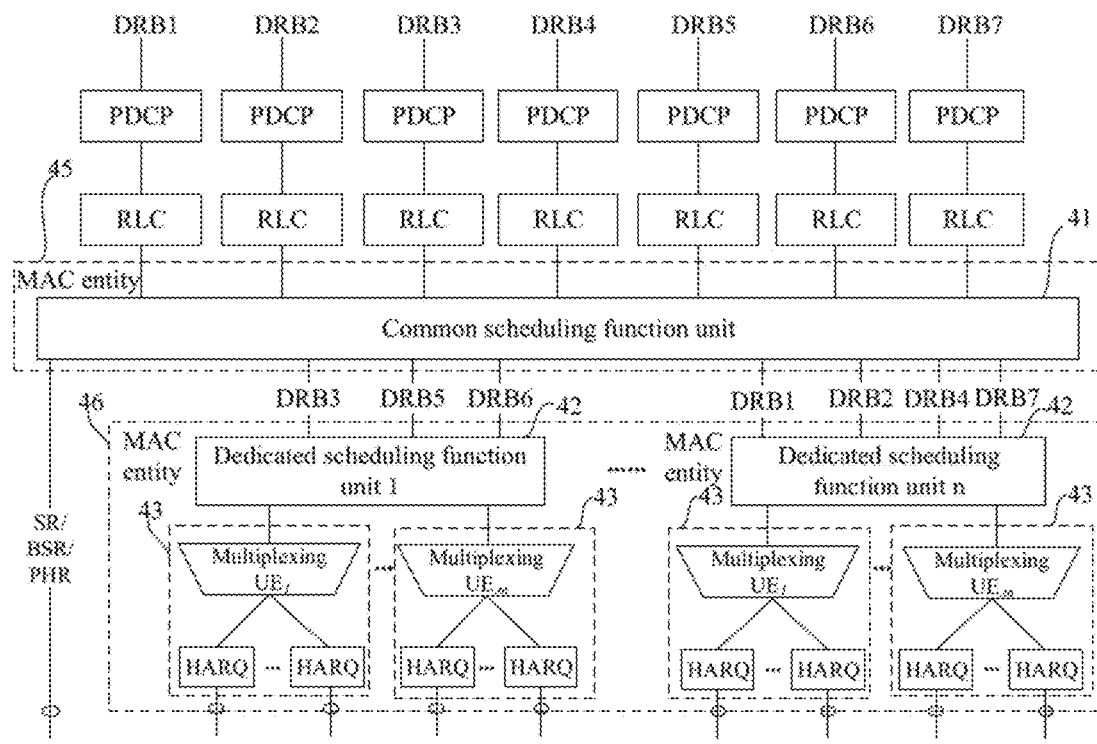
FIG. 6 is a first schematic diagram of a media access control layer architecture according to an embodiment of the present disclosure.

Reference is made to FIG. 6. In FIG. 6, the common scheduling function unit 41 is located in a first MAC entity 45, and all the dedicated scheduling function units and the more than one multiplexing and retransmission function unit are located in a second MAC entity 46. The first MAC entity 45 and the second MAC entity 46 are mutually independent.

Figure 7:
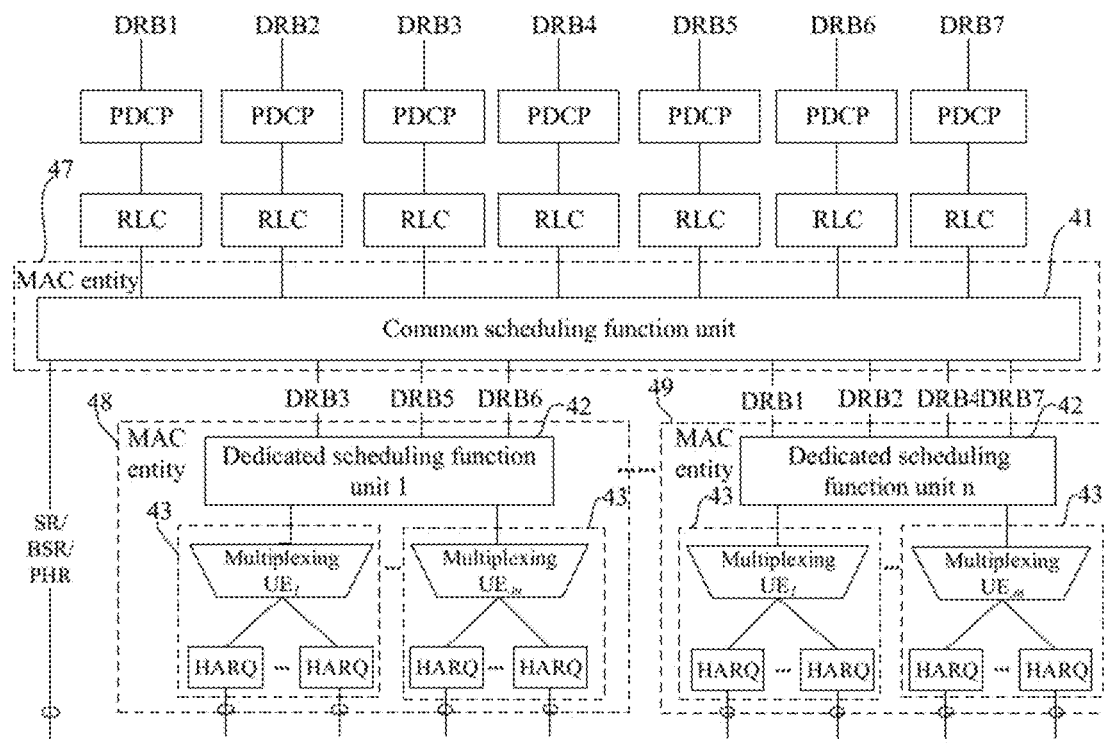
FIG. 7 is a second schematic diagram of a media access control layer architecture according to an embodiment of the present disclosure.

Reference is made to FIG. 7. In FIG. 7, the common scheduling function unit 41 is located in an MAC entity 47; the at least one dedicated scheduling function unit 42 is each located in a different MAC entity, and any dedicated scheduling function unit 42 and the corresponding multiplexing and retransmission function unit 43 thereof are both located in the same MAC entity; and, the MAC entities where the common scheduling function unit 41 and all the dedicated scheduling function units 42 are respectively located are mutually independent. For example, different dedicated scheduling function units 42 are respectively located in different MAC entity. For example, in FIG. 7, the dedicated scheduling function unit 1 is located in an MAC entity 48, and the dedicated scheduling function unit n is located in an MAC entity 49.

As can be seen from the above, the common scheduling function unit and the dedicated scheduling function unit at the network side may be located in the same MAC entity or in different MAC entities that are mutually independent. The dedicated scheduling function units (with the multiplexing and retransmission function units corresponding to the dedicated scheduling function units) at the network side may be located in the same MAC entity or in different MAC entities that are mutually independent.

The embodiments of the present disclosure also provide a network-side device, which includes the media access control layer architecture described above.

Figure 9:
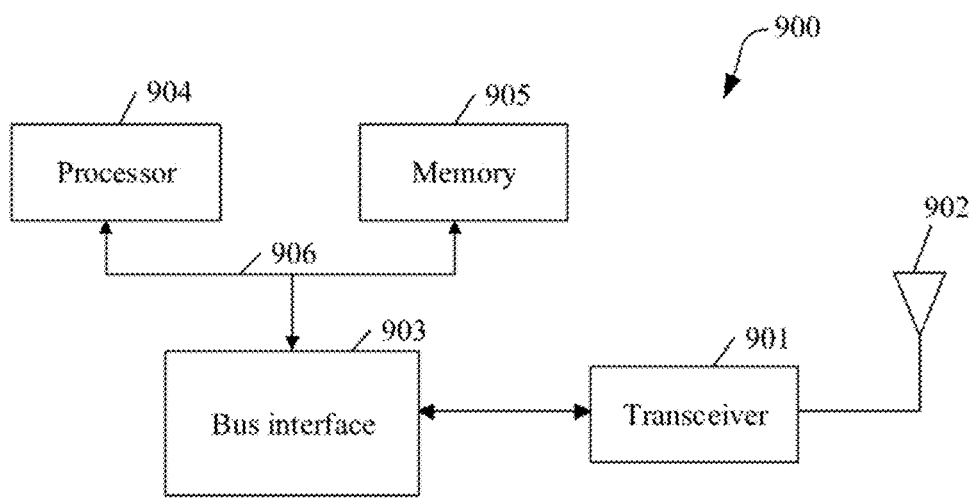
FIG. 9 is a block diagram of an example of a network-side device according to an embodiment of the present disclosure.

FIG. 9 illustrates a block diagram of an example of a network-side device according to an embodiment of the present disclosure. The network-side device 900 may include a transceiver 901 and a processor 904.

The transceiver 901 receives and transmits data under the control of the processor 904, which may specifically, receive a Scheduling Request (SR), Buffer Status Report (BSR) and Power Headroom Report (PHR) information transmitted by a terminal.

The processor 904 is configured to read programs in a memory 905, execute one or more functions of any of the common scheduling function unit, the dedicated scheduling function unit and the multiplexing and retransmission function unit as described above.

In FIG. 9, a bus architecture (represented by a bus 906) may include an arbitrary quantity of interconnected buses and bridges. Various circuits of one or more processors represented by the processor 904 and a memory represented by the memory 905 are coupled via the bus 906. Various other circuits, such as a peripheral device, a voltage regulator, and a power management circuit, may also be coupled via the bus 906, which are well known in the art, and will not be repeated herein. A bus interface 903 provides an interface between the bus 906 and the transceiver 901. The transceiver 901 may be one element or a plurality of elements, such as a plurality of receivers and transmitters, providing a unit for communicating with various other devices over a transmission medium. Data processed by the processor 904 is transmitted over a radio medium via the transceiver 901 and an antenna 902. Further, the antenna 902 also receives data and transmits the data to the processor 904 via the transceiver 901.

The processor 904 is in charge of managing the bus 906 and common processing, and may also provide various functions including timing, peripheral interfaces, voltage regulation, power management, and other control functions. The memory 905 may be configured to store data used by the processor 904 in performing operations. Specifically, the processor 904 may be a CPU, an ASIC, an FPGA or a CPLD.

Figure 10:
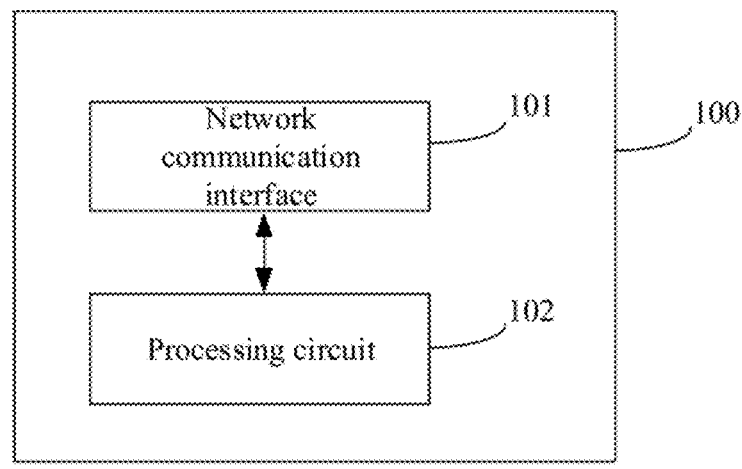
FIG. 10 is a block diagram of another example of a network-side device according to an embodiment of the present disclosure.

FIG. 10 illustrates a block diagram of another example of a network-side device according to an embodiment of the present disclosure. The network-side device 100 may include a processing circuit 102 coupled to a network communication interface 101. The processing circuit 102 may be adapted to implement the media access control layer architecture of any one of FIGS. 4 to 7, and, execute one or more functions of any of the common scheduling function unit, the dedicated scheduling function unit and the multiplexing and retransmission function unit as mentioned above, to facilitate data processing for services that are based on different bearer sets.

Those of ordinary skill in the art will recognize that in general, the vast majority of processing described in the present disclosure can be implemented in a similar manner. Any circuit or segment in the processing circuit may be implemented alone or in combination with one or more processors as a part of an integrated circuit. One or more of these circuits may be implemented in an integrated circuit, an Advanced RISC Machine (ARM) processor, a Digital Signal Processor (DSP), a general purpose processor, etc.

Figure 8:
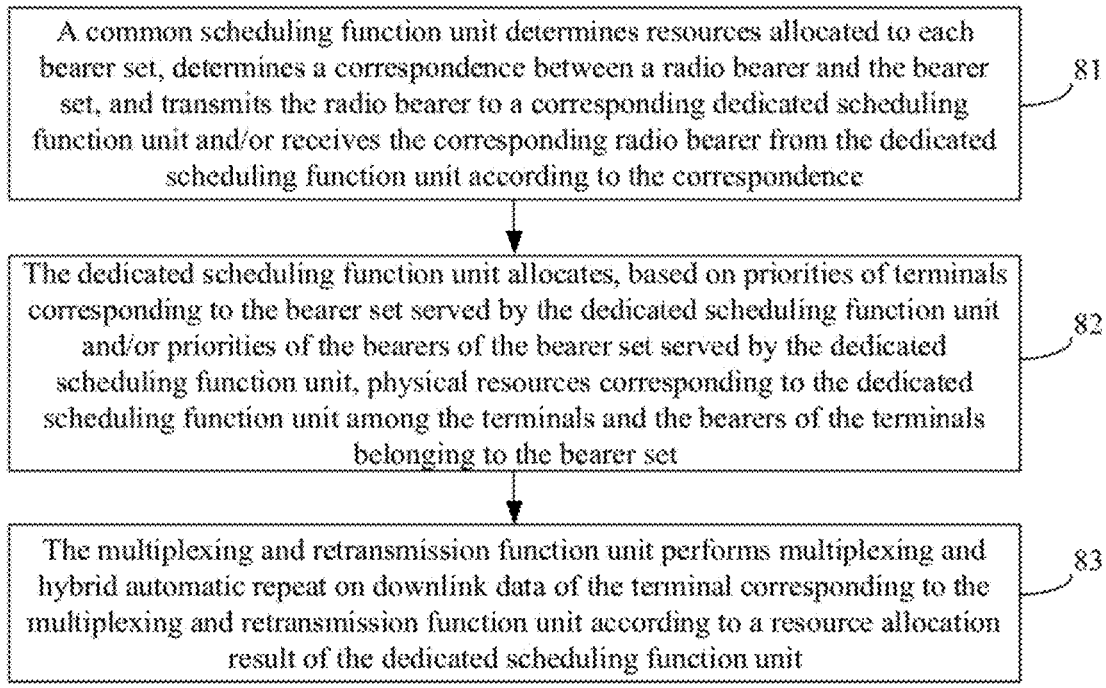
FIG. 8 is a third schematic diagram of a media access control layer architecture according to an embodiment of the present disclosure.

Based on the media access control layer architecture provided by the above embodiments, the embodiments of the present disclosure also provide a method for transmitting data. Reference is made to FIG. 8. The method for transmitting data provided by the embodiments of the present disclosure includes the following steps.

In step 81, the common scheduling function unit determines resources allocated to each bearer set, determines a correspondence between a radio bearer and the bearer set, and transmits the radio bearer to a corresponding dedicated scheduling function unit and/or receives the corresponding radio bearer from the dedicated scheduling function unit according to the correspondence.

In step 82, the dedicated scheduling function unit allocates, based on priorities of terminals corresponding to the bearer set served by the dedicated scheduling function unit and/or priorities of the bearer of the bearer set served by the dedicated scheduling function unit, physical resources corresponding to the dedicated scheduling function unit among the terminals and the bearers of the terminals belonging to the bearer set.

In step 83, the multiplexing and retransmission function unit performs multiplexing and hybrid automatic repeat on downlink data of the terminal corresponding to the multiplexing and retransmission function unit according to a resource allocation result of the dedicated scheduling function unit.

In the method above, the common scheduling function unit may further execute one or more of the following actions:

1) receiving a Buffer Status Report (BSR) of the terminal;

2) receiving scheduling request (SR) information of the terminal;

3) reporting allocated resources for the BSR of the terminal;

4) determining uplink buffer status information of each bearer set according to the BSR, and transmitting the uplink buffer status information to the dedicated scheduling function unit corresponding to each bearer set;

5) receiving and processing Power Headroom Report (PHR) information of a physical layer; or 6) allocating a terminal transmission power among the bearer sets to obtain terminal power allocation information of the bearer sets and transmit the terminal power allocation information to the dedicated scheduling function unit corresponding to each bearer set.

In the method above, the dedicated scheduling function unit may further execute one or more of the following actions:

1) allocating downlink resources based on downlink buffer status information corresponding to a downlink bearer set served by the dedicated scheduling function unit;

2) allocating uplink resources based on uplink buffer status information corresponding to an uplink bearer set served by the dedicated scheduling function unit that is provided by the common scheduling function unit; or 3) allocating uplink resources for a terminal served by the dedicated scheduling function unit according to terminal power allocation information provided by the common scheduling function unit.

As mentioned above, as an implementation, the common scheduling function unit, the at least one dedicated scheduling function unit, and the more than one multiplexing and retransmission function unit may all be located in the same MAC entity.

As another implementation, the common scheduling function unit is located in a first MAC entity, all the dedicated scheduling function units and all the multiplexing and retransmission function units are located in a second MAC entity, and the first MAC entity and the second MAC entity are mutually independent.

As another implementation, the common scheduling function unit is located in an MAC entity; the dedicated scheduling function unit and its corresponding multiplexing and retransmission function unit are both located in a same MAC entity, and the MAC entities where the common scheduling function unit and each dedicated scheduling function unit are respectively located are mutually independent.

Second Embodiment

Figure 11:
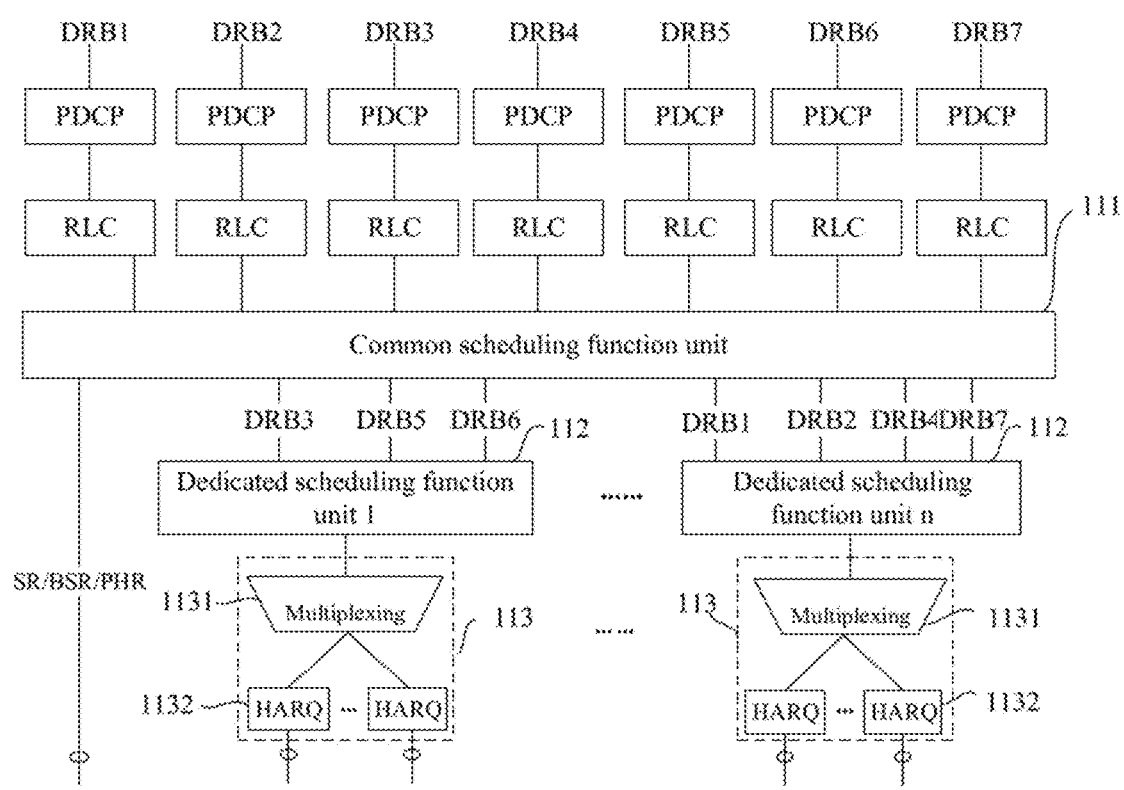
FIG. 11 is a schematic diagram of a media access control layer architecture according to an embodiment of the present disclosure.

Reference is made to FIG. 11. A media access control layer architecture of a terminal-side device provided by the embodiments of the present disclosure includes:

a common scheduling function unit 111;

at least one dedicated scheduling function unit 112, each dedicated scheduling function unit 112 corresponding to a bearer set of a terminal, and the bearer set including one or more bearers; and more than one multiplexing and retransmission function unit 113, each multiplexing and retransmission function unit corresponding to one bearer set of the terminal.

In FIG. 11, each multiplexing and retransmission function unit 113 includes one multiplexing function unit 1131, such as Multiplexing in FIG. 11, and each multiplexing function unit 1131 is corresponding to one bearer set of the terminal. The multiplexing function unit 1131 of each multiplexing and retransmission function unit 113 is also connected with a plurality of retransmission function units 1132. As the HARQ shown in FIG. 11, each retransmission function unit 1132 is generally corresponding to one HARQ process.

In order to realize data processing function for services that are based on different bearer sets, the embodiment of the present disclosure divides the functions of the terminal-side media access control layer into the three function units as described above.

In FIG. 11, the common scheduling function unit 111 may be configured to execute one or more of the following functions:

1) determining a mapping relationship between a Radio Bearer (RB) and the bearer set;

2) transmitting a Buffer Status Report (BSR) of the terminal;

3) transmitting Scheduling Request (SR) information of the terminal; or 4) transmitting Power Headroom Report (PHR) information of a physical layer.

To be specific, the common scheduling function unit 111 may determine the mapping relationship between the RB and the bearer set according to one or more of the following parameters: a QoS parameter of the RB, a mapping relationship between the RB and a network slice, and a mapping relationship between the RB and a numerology.

In FIG. 11, the dedicated scheduling function unit 112 may be configured to allocate physical resources corresponding to the dedicated scheduling function unit among the bearers of the terminal belonging to the bearer set based on a priority of the terminal and/or priorities of the bearers corresponding to the bearer set served by the dedicated scheduling function unit.

To be specific, the dedicated scheduling function unit 112 is further configured to allocate resources in the bearer set served by the dedicated scheduling function unit according to the following manner: allocating uplink resources based on uplink buffer status information corresponding to an uplink bearer set served by the dedicated scheduling function unit;

In FIG. 11, the multiplexing and retransmission function unit 113 may be configured to perform multiplexing and hybrid automatic repeat on uplink data of the bearer set corresponding to the multiplexing and retransmission function unit.

The specific functions of each function unit are described above in connection with the function units of the terminal-side media access control layer provided in FIG. 11. With the above function units, the embodiments of the present disclosure design a corresponding media access control layer architecture for various bearer sets, and realize data processing for services that are based on different bearer sets.

In the embodiments of the present disclosure, the above-mentioned function units of the terminal-side media access control layer as shown in FIG. 11 may be located in different MAC entities. Descriptions are further provided hereinafter with reference to the accompanying drawings.

Figure 12:
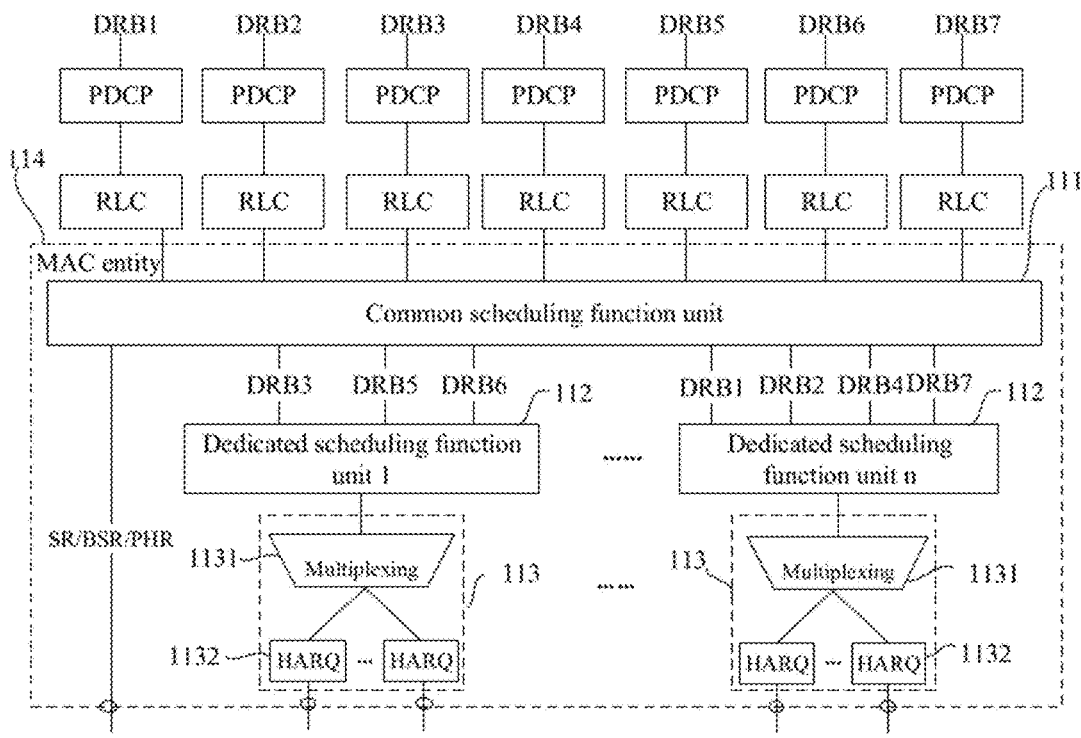
FIG. 12 is a schematic flow chart of a method for transmitting data according to an embodiment of the present disclosure.

Reference is made to FIG. 12. The common scheduling function unit 111, all the dedicated scheduling function units 112 and all the multiplexing and retransmission function units 113 are located in the same MAC entity 114.

Processes for establishing and releasing the above-mentioned MAC entity include: establishing the MAC entity while establishing RRC connection of the terminal; and releasing the MAC entity while releasing the RRC connection of the terminal.

For the terminal side, its MAC entity corresponds to that of the network side. For the media access control layer architecture shown in FIG. 5, there is one MAC entity at the network side, then the terminal side also has only one MAC entity for the network device.

Figure 13:
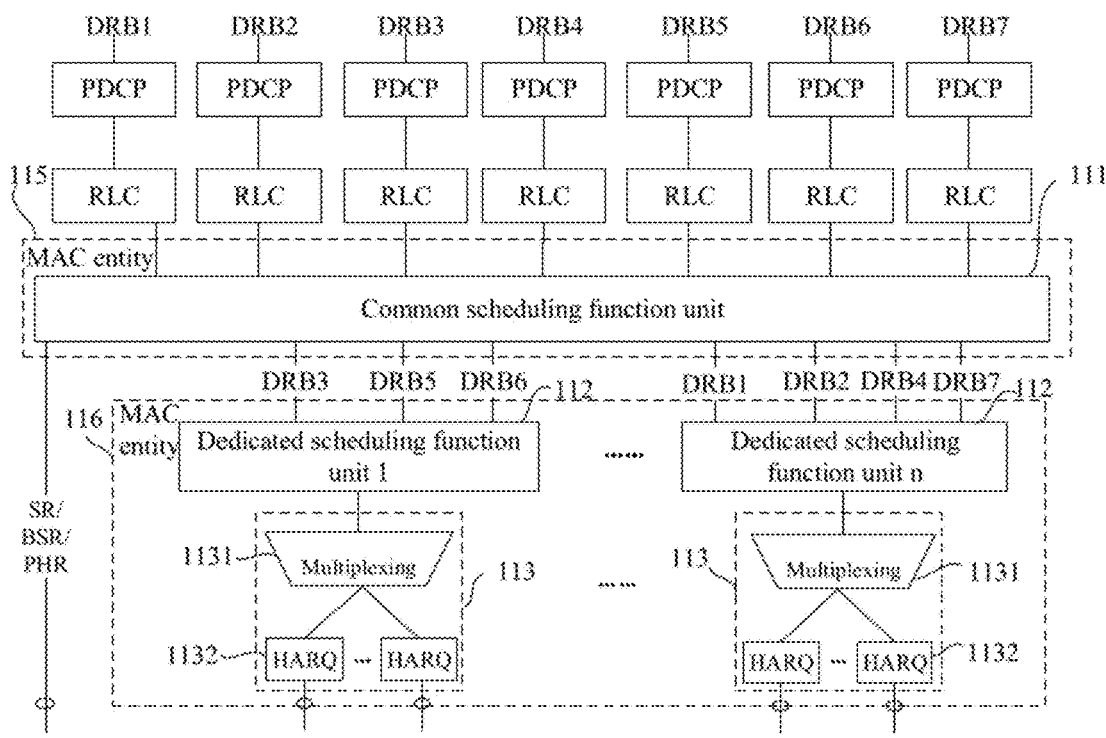
FIG. 13 is a first schematic diagram of a media access control layer architecture according to an embodiment of the present disclosure.

Reference is made to FIG. 13. In FIG. 13, the common scheduling function unit 111 is located in a first MAC entity 115, all the dedicated scheduling function units and the more than one multiplexing and retransmission function unit are all located in a second MAC entity 116. The first MAC entity 115 and the second MAC entity 116 are mutually independent.

Processes for establishing and releasing the above-mentioned MAC entities include: establishing the first MAC entity while establishing RRC connection of the terminal; releasing the first MAC entity while releasing the RRC connection of the terminal; and, establishing the second MAC entity while establishing a first bearer for a first bearer set of the terminal; and releasing the second MAC entity while all the bearers of all the bearer sets corresponding to the second MAC entity are released or service data transmission of all the bearers of all the bearer sets corresponding to the second MAC entity stops for a time exceeding a predetermined threshold.

For the terminal side, its MAC entity corresponds to that of the network side. For the media access control layer architecture shown in FIG. 6, the network side includes the first MAC entity 45 (including the common scheduling function unit) and the second MAC entity 46 (including all the dedicated scheduling function units), then it is also needed to establish at the terminal side the first MAC entity 115 including the common scheduling function unit and the second MAC entity 116 including a plurality of dedicated scheduling function units corresponding to each bearer set of the terminal and the multiplexing and retransmission function units.

Figure 14:
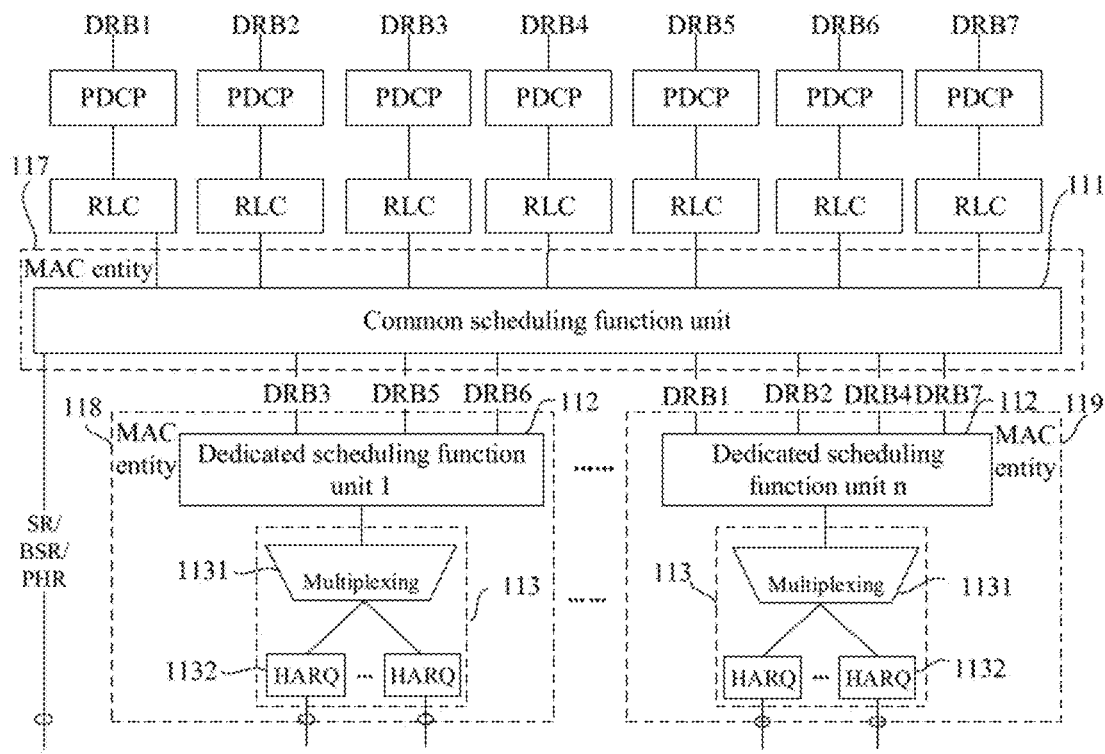
FIG. 14 is a second schematic diagram of a media access control layer architecture according to an embodiment of the present disclosure.

Reference is made to FIG. 14. In FIG. 14, the common scheduling function unit 111 is located in an MAC entity 117; the dedicated scheduling function unit 112 and the corresponding multiplexing and retransmission function unit 113 thereof are both located in the same MAC entity; and, the MAC entities where the common scheduling function unit 111 and all the dedicated scheduling function units 112 are respectively located are mutually independent. For example, different dedicated scheduling function units 112 are respectively located in different MAC entities, such as an MAC entity 118 and an MAC entity 119 in FIG. 14.

The first MAC entity is established while establishing RRC connection of the terminal; the first MAC entity is released while releasing the RRC connection of the terminal; and, the second MAC entity corresponding to a bearer set is established while establishing a first bearer for the first bearer set of the terminal; and the second MAC entity is released while all the bearers of the bearer set corresponding to the second MAC entity are released or service data transmission of all the bearers of the bearer set corresponding to the second MAC entity stops for a time exceeding a predetermined threshold.

For the terminal side, the MAC entity thereof corresponds to that of the network side. For the media access control layer architecture shown in FIG. 7, the MAC entity at the network side includes an MAC entity 47 (including the common scheduling function unit) and one or more MAC entities including the dedicated scheduling function unit, and each MAC entity may include one dedicated scheduling function unit (for example, the MAC entity 48 including the dedicated scheduling function unit 1 and the MAC entity 49 including the dedicated scheduling function unit n). Then, for the MAC entities at the terminal side, it is also needed to establish the first MAC entity including the common scheduling function unit and a plurality of second MAC entities, wherein each of the second MAC entities is corresponding to one bearer set of the terminal.

As can be seen from the above, the common scheduling function unit and the dedicated scheduling function unit of the terminal may be located in the same MAC entity or in different MAC entities that are mutually independent. The dedicated scheduling function units at the terminal side (with the multiplexing and retransmission function units corresponding to the dedicated scheduling function units) may be located in the same MAC entity or in different MAC entities that are mutually independent.

The embodiments of the present disclosure also provide a terminal, which includes the media access control layer architecture as described above.

Figure 15:
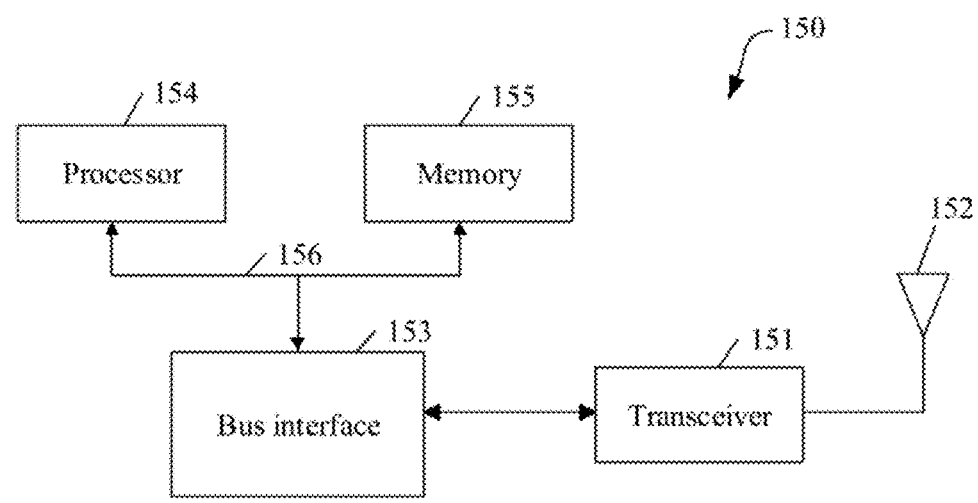
FIG. 15 is a third schematic diagram of a media access control layer architecture according to an embodiment of the present disclosure.

FIG. 15 illustrates a block diagram of an example of a terminal provided by the embodiment of the present disclosure. The terminal 120 may include:

a transceiver 151 receiving and transmitting data under the control of a processor 154, which may specifically, receive downlink data transmitted from a network side; and a processor 154, configured to read programs in a memory 155, execute one or more functions of any of the common scheduling function unit, the dedicated scheduling function unit and the multiplexing and retransmission function unit in FIG. 11.

In FIG. 15, a bus architecture (represented by a bus 156) may include an arbitrary quantity of interconnected buses and bridges. Various circuits of one or more processors represented by the processor 154 and a memory represented by the memory 155 are coupled via the bus 156. Various other circuits, such as a peripheral device, a voltage regulator, a power management circuit, may also be coupled via the bus 156, which are well known in the art, and will not be repeated herein. A bus interface 153 provides an interface between the bus 156 and the transceiver 151. The transceiver 151 may be one element or a plurality of elements, such as a plurality of receivers and transmitters, providing a unit for communicating with various other devices over a transmission medium. Data processed by the processor 154 is transmitted over a radio medium via the transceiver 151 and an antenna 152. Further, the antenna 152 also receives data and transmits the data to the processor 154 via the transceiver 151.

The processor 154 is in charge of managing the bus 156 and common processing, and may also provide various functions including timing, peripheral interfaces, voltage regulation, power management, and other control functions. The memory 155 may be configured to store data used by the processor 154 in performing operations. Specifically, the processor 154 may be a CPU, an ASIC, an FPGA or a CPLD.

FIG. 16 illustrates a block diagram of another example of a network-side device provided by an embodiment of the present disclosure. The network-side device 160 may include a processing circuit 162 coupled to a network communication interface 161. The processing circuit 162 may be adapted to implement the media access control layer architecture of any one of FIGS. 11 to 14, and, execute one or more functions of any one of the common scheduling function unit, the dedicated scheduling function unit and the multiplexing and retransmission function unit as mentioned above, to facilitate data processing for services that are based on different bearer sets.

Those of ordinary skill in the art will recognize that in general, the vast majority of processing described in the present disclosure can be implemented in a similar manner. Any circuit or segment in the processing circuit may be implemented alone or in combination with one or more processors as a part of an integrated circuit. One or more of these circuits may be implemented in an integrated circuit, an Advanced RISC Machine (ARM) processor, a Digital Signal Processor (DSP), a general purpose processor, etc.

Based on the media access control layer architecture provided by the above embodiments, the embodiments of the present disclosure also provide a method for transmitting data. Reference is made to FIG. 17. The method for transmitting data provided by the embodiments of the present disclosure includes the following steps.

In step 171, the common scheduling function unit determines a correspondence between a radio bearer and the bearer set, and transmits the radio bearer to a corresponding dedicated scheduling function unit and/or receives the corresponding radio bearer from the dedicated scheduling function unit according to the correspondence.

In step 172, the dedicated scheduling function unit allocates physical resources corresponding to the dedicated scheduling function unit among the bearers of the terminal belonging to the bearer set based on a priority of the terminal and/or priorities of the bearers corresponding to a bearer set served by the dedicated scheduling function unit.

In step 173, the multiplexing and retransmission function unit performs multiplexing and hybrid automatic repeat on uplink data of the bearer set corresponding to the multiplexing and retransmission function unit according to a resource allocation result of the dedicated scheduling function unit.

In the method above, the common scheduling function unit may further execute one or more of the following actions:

1) transmitting a Buffer Status Report BSR of the terminal;

2) transmitting Scheduling Request SR information of the terminal; and 3) transmitting Power Headroom Report PHR information of a physical layer.

In the method above, the dedicated scheduling function unit may further execute one or more of the following actions: allocating uplink resources based on uplink buffer status information corresponding to an uplink bearer set served by the dedicated scheduling function unit;

As mentioned above and in FIG. 12, as an implementation, the common scheduling function unit, the at least one dedicated scheduling function unit, and the more than one multiplexing and retransmission function unit may be located in the same MAC entity. In this case, the above-mentioned method further includes: establishing the MAC entity while establishing RRC connection of the terminal; and releasing the MAC entity while releasing the RRC connection of the terminal.

As mentioned above and in FIG. 13, as another implementation, the common scheduling function unit is located in a first MAC entity, the at least one dedicated scheduling function unit and the more than one multiplexing and retransmission function unit are located in a second MAC entity, and the first MAC entity and the second MAC entity are mutually independent. In this case, the above-mentioned method further includes: establishing the first MAC entity while establishing RRC connection of the terminal; releasing the first MAC entity while releasing the RRC connection of the terminal; and, establishing the second MAC entity while establishing a first bearer for a first bearer set of the terminal; and releasing the second MAC entity while all the bearers of all the bearer sets corresponding to the second MAC entity are released or service data transmission of all the bearers of all the bearer sets corresponding to the second MAC entity stops for a time exceeding a predetermined threshold.

As mentioned above and in FIG. 14, as another implementation, the common scheduling function unit is located in an MAC entity; the dedicated scheduling function unit and the corresponding multiplexing and retransmission function unit thereof are located in the same MAC entity, and the MAC entities where the common scheduling function unit and each of the dedicated scheduling function unit are respectively located are mutually independent. In this case, the above-mentioned method for transmitting data further includes: establishing the first MAC entity while establishing RRC connection of the terminal; releasing the first MAC entity while releasing the RRC connection of the terminal; and, establishing the second MAC entity corresponding to a bearer set while establishing a first bearer for the first bearer set of the terminal; and releasing the second MAC entity while all the bearers of the bearer set corresponding to the second MAC entity are released or service data transmission of all the bearers of the bearer set corresponding to the second MAC entity stops for a time exceeding a predetermined threshold.

In conclusion, according to the media access control layer architecture and the method for transmitting data provided by the embodiments of the present disclosure, an MAC layer architecture is provided, which can provide a service for a network using multiple bearer sets, to enable the multiple bearer sets well cooperate in working.

The descriptions above are merely preferred embodiments of the present disclosure. It should be noted that those of ordinary skills in the art may make various improvements and polishments without departing from the principle of the disclosure, and these improvements and polishments shall also fall within the protection scope of the present disclosure.

What is claimed is:

1. A network-side device, comprising a processor, a memory, and a program stored in the memory and executable by the processor, wherein when the program is executed by the processor, the processor is configured to perform functions of the following units:
   a common scheduling function unit;
   at least one dedicated scheduling function unit, each dedicated scheduling function unit corresponding to a bearer set comprising one or more bearers; and
   more than one multiplexing and retransmission function unit, each multiplexing and retransmission function unit corresponding to one terminal;
   wherein the common scheduling function unit is configured to determine resources allocated for each dedicated scheduling function unit according to one or more of: static allocation, semi-static allocation or dynamic allocation;
   wherein the dedicated scheduling function unit is configured to perform, based on at least one of: priorities of terminals or of the bearers corresponding to the bearer set served by the dedicated scheduling function unit, resource allocation on physical resources corresponding to the dedicated scheduling function unit among each terminal and each bearer of each terminal belonging to the bearer set.

2. The network-side device according to claim 1, wherein the bearers comprised in the bearer set have same or similar Quality of Service (QoS) parameters, or, the bearers comprised in the bearer set use a same numerology, or, the bearers comprised in the bearer set belong to a same network slice.

3. The network-side device according to claim 1, wherein the common scheduling function unit is configured to execute one or more of the following functions:
    determining resources allocated to each bearer set;
    determining a mapping relationship between a radio bearer (RB) and the bearer set;
    receiving a Buffer Status Report (BSR) of a terminal;
    receiving Scheduling Request (SR) information of a terminal;
    reporting allocated resources for BSR of a terminal;
    determining uplink buffer status information of each bearer set according to BSR, and transmitting the uplink buffer status information to the dedicated scheduling function unit corresponding to the each bearer set;
    receiving and processing Power Headroom Report (PHR) information of a physical layer; or
    allocating a terminal transmission power among the bearer sets to obtain terminal power allocation information of the bearer sets and transmit the terminal power allocation information to the dedicated scheduling function unit corresponding to each bearer set.

4. The network-side device according to claim 3, wherein:
    the common scheduling function unit determines the mapping relationship between the RB and the bearer set according to one or more of the following parameters: a QoS parameter of the RB, a mapping relationship between the RB and a network slice, or, a mapping relationship between the RB and a numerology; or,
    the common scheduling function unit is configured to adjust, according to feedback information of each dedicated scheduling function unit, physical resources allocated to each dedicated scheduling function unit.

5. The network-side device according to claim 1, wherein the dedicated scheduling function unit is configured to perform resource allocation in the bearer set served by the dedicated scheduling function unit according to one or more of the following manners: perform downlink resource allocation based on downlink buffer status information corresponding to a downlink bearer set served by the dedicated scheduling function unit; perform uplink resource allocation based on uplink buffer status information corresponding to an uplink bearer set served by the dedicated scheduling function unit that is provided by the common scheduling function unit; or perform uplink resource allocation for a terminal served by the dedicated scheduling function unit according to terminal power allocation information provided by the common scheduling function unit.

6. The network-side device according to claim 1, wherein the multiplexing and retransmission function unit is configured to perform multiplexing and hybrid automatic repeat on downlink data of the terminal corresponding to the multiplexing and retransmission function unit.

7. The network-side device according to claim 1, wherein:
    the common scheduling function unit, the at least one dedicated scheduling function unit and the more than one multiplexing and retransmission function unit are all located in a same MAC entity; or,
    the common scheduling function unit is located in a first MAC entity, the at least one dedicated scheduling function unit and the more than one multiplexing and retransmission function unit are located in a second MAC entity, and the first MAC entity and the second MAC entity are mutually independent; or,
    the common scheduling function unit is located in a MAC entity, the at least one dedicated scheduling function unit is each located in a different MAC entity, each dedicated scheduling function unit and its corresponding multiplexing and retransmission function unit are located in the same MAC entity, and the MAC entities where the common scheduling function unit and the at least one dedicated scheduling function unit are respectively located are mutually independent.

8. A method for transmitting data, applied to network-side device according to claim 1, comprising:
    determining, by the common scheduling function unit, resources allocated to each bearer set, determining a correspondence between a radio bearer and the bearer set, and performing at least one of the following: transmitting the radio bearer to the corresponding dedicated scheduling function unit or receiving the corresponding radio bearer from the dedicated scheduling function unit according to the correspondence;
    performing, by the dedicated scheduling function unit, based on at least one of: priorities of terminals corresponding to the bearer set served by the dedicated scheduling function unit or priorities of the bearers of the bearer set served by the dedicated scheduling function unit, resource allocation on physical resources corresponding to the dedicated scheduling function unit among the terminals and the bearers of the terminals belonging to the bearer set; and
    performing, by the multiplexing and retransmission function unit, multiplexing and hybrid automatic repeat on downlink data of the terminal corresponding to the multiplexing and retransmission function unit according to a resource allocation result of the dedicated scheduling function unit.

9. A terminal, comprising a processor, a memory, and a program stored in the memory and executable by the processor, wherein when the program is executed by the processor, the processor is configured to perform functions of the following units:
    a common scheduling function unit;
    at least one dedicated scheduling function unit, each dedicated scheduling function unit corresponding to a bearer set of a terminal, and the bearer set comprising one or more bearers; and
    more than one multiplexing and retransmission function unit, each multiplexing and retransmission function unit corresponding to one bearer set of the terminal;
    wherein the common scheduling function unit is configured to determine the mapping relationship between the RB and the bearer set according to one or more of the following parameters: a QoS parameter of the RB, a mapping relationship between the RB and a network slice, or, a mapping relationship between the RB and a numerology;
    wherein the dedicated scheduling function unit is configured to perform, based on at least one of: a priority of the terminal or priorities of the bearers corresponding to the bearer set served by the dedicated scheduling function unit, resource allocation on physical resources corresponding to the dedicated scheduling function unit among the bearers of the terminal belonging to the bearer set.

10. The terminal according to claim 9, wherein the bearers comprised in the bearer set have same or similar Quality of Service (QoS) parameters, or, the bearers comprised in the bearer set use a same numerology, or, the bearers comprised in the bearer set belong to a same network slice.

11. The terminal according to claim 9, wherein the common scheduling function unit is configured to execute one or more of the following functions: determining a mapping relationship between a radio bearer (RB) and the bearer set; transmitting a Buffer Status Report (BSR) of the terminal; transmitting Scheduling Request (SR) information of the terminal; or transmitting Power Headroom Report (PHR) information of a physical layer.

12. The terminal according to claim 9, wherein the dedicated scheduling function unit is configured to perform resource allocation in the bearer set served by the dedicated scheduling function unit according to the following manner: perform uplink resource allocation based on uplink buffer status information corresponding to an uplink bearer set served by the dedicated scheduling function unit.

13. The terminal according to claim 9, wherein the multiplexing and retransmission function unit is configured to perform multiplexing and hybrid automatic repeat on uplink data of the bearer set corresponding to the multiplexing and retransmission function unit.

14. The terminal according to claim 9, wherein
the common scheduling function unit, the at least one dedicated scheduling function unit and the more than one multiplexing and retransmission function unit are all located in a same MAC entity; or,
the common scheduling function unit is located in a first MAC entity, the at least one dedicated scheduling function unit and the more than one multiplexing and retransmission function unit are located in a second MAC entity, and the first MAC entity and the second MAC entity are mutually independent; or,
the common scheduling function unit is located in a MAC entity, the at least one dedicated scheduling function unit is each located in a different MAC entity, each dedicated scheduling function unit and its corresponding multiplexing and retransmission function unit are located in the same MAC entity, and the MAC entities where the common scheduling function unit and the at least one dedicated scheduling function unit are respectively located are mutually independent.

15. A method for transmitting data, applied to the terminal according to claim 9, comprising:
determining, by the common scheduling function unit, a correspondence between a radio bearer and the bearer set, and performing at least one of: transmitting the radio bearer to the corresponding dedicated scheduling function unit or receiving the corresponding radio bearer from the dedicated scheduling function unit according to the correspondence;
performing, by the dedicated scheduling function unit, based on at least one of: a priority of the terminal or priorities of the bearers corresponding to the bearer set served by the dedicated scheduling function unit, resource allocation on physical resources corresponding to the dedicated scheduling function unit among the bearers of the terminal belonging to the bearer set; and
performing, by the multiplexing and retransmission function unit, multiplexing and hybrid automatic repeat on uplink data of the bearer set corresponding to the multiplexing and retransmission function unit according to a resource allocation result of the dedicated scheduling function unit.

16. The method for transmitting data according to claim 15, wherein:
the common scheduling function unit, the at least one dedicated scheduling function unit and the more than one multiplexing and retransmission function unit are all located in a same MAC entity, and the method further comprises: establishing the MAC entity when establishing an RRC connection of the terminal, and releasing the MAC entity when releasing the RRC connection of the terminal; or,
the common scheduling function unit is located in a first MAC entity, the at least one dedicated scheduling function unit and the more than one multiplexing and retransmission function unit are located in a second MAC entity, the first MAC entity and the second MAC entity are mutually independent, and the method further comprises: establishing the first MAC entity when establishing an RRC connection of the terminal, releasing the first MAC entity when releasing the RRC connection of the terminal, establishing the second MAC entity when establishing a first bearer for a first bearer set of the terminal, and releasing the second MAC entity when all bearers of all bearer sets corresponding to the second MAC entity are released or service data transmission of all bearers of all bearer sets corresponding to the second MAC entity stops for a time exceeding a predetermined threshold; or,
the common scheduling function unit is located in a first MAC entity, the at least one dedicated scheduling function unit is each located in a different second MAC entity, each dedicated scheduling function unit and its corresponding multiplexing and retransmission function unit are located in the same second MAC entity, the first MAC entity where the common scheduling function unit is located and each second MAC entity are mutually independent, the second MAC entities where the at least one dedicated scheduling function unit is located are mutually independent, and the method further comprises: establishing the first MAC entity when establishing an RRC connection of the terminal, releasing the first MAC entity when releasing the RRC connection of the terminal, establishing the second MAC entity corresponding to a bearer set when establishing a first bearer for the first bearer set of the terminal, and releasing the second MAC entity when all bearers of the bearer set corresponding to the second MAC entity are released or service data transmission of all bearers of the bearer set corresponding to the second MAC entity stops for a time exceeding a predetermined threshold.

* * * * *